United States Patent
Sablan et al.

[11] Patent Number: 6,079,071
[45] Date of Patent: Jun. 27, 2000

[54] EMERGENCY GLASS REMOVAL TOOL

[76] Inventors: Daniel Sablan, 74 Mosswood Dr., Suisun City, Calif. 94585; Dennis R. Fraticelli, 146 Weymouth Ct., Vacaville, Calif. 95687

[21] Appl. No.: 09/247,990

[22] Filed: Feb. 11, 1999

[51] Int. Cl.⁷ .................................................. B25D 1/04
[52] U.S. Cl. ........................................ 7/144; 30/155
[58] Field of Search ............................ 7/144, 110, 158, 7/161, 169; 30/155

[56] References Cited

U.S. PATENT DOCUMENTS

| | | | |
|---|---|---|---|
| D. 233,405 | 10/1974 | Frey | D8/76 |
| D. 299,414 | 1/1989 | Bajza et al. | D8/105 |
| 4,985,954 | 1/1991 | Wehr | 7/144 |

*Primary Examiner*—James G. Smith
*Assistant Examiner*—Hadi Shakeri

[57] ABSTRACT

A emergency glass removal tool for breaking out a windshield and other windows of a vehicle for extricating a person from the vehicle. The emergency glass removal tool includes an elongate frame member that has opposite first and second ends and a longitudinal axis extending between the ends. A handle portion is coupled to the second end of the frame member and has a grasping portion, a scraping portion extending between the grasping portion and the second end of the frame member, and an ax portion extending between the grasping portion and the second end of the frame member.

15 Claims, 2 Drawing Sheets

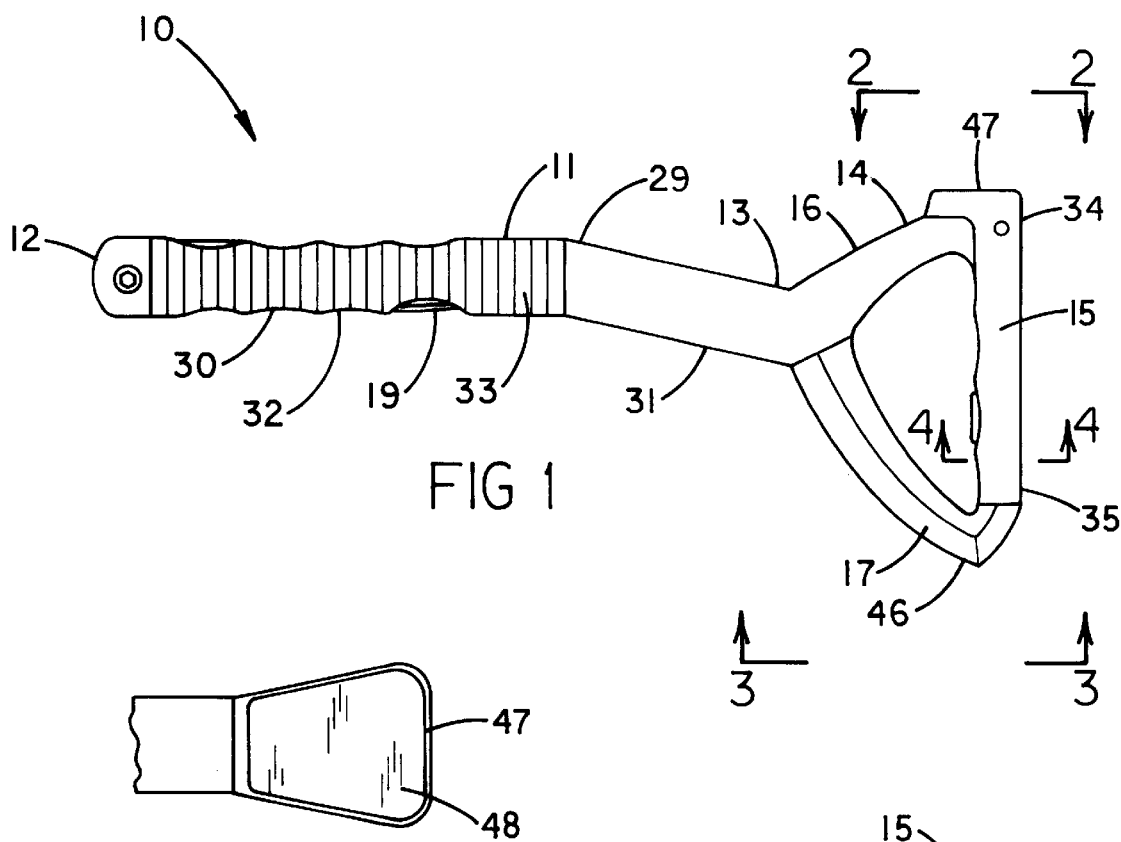
FIG 1
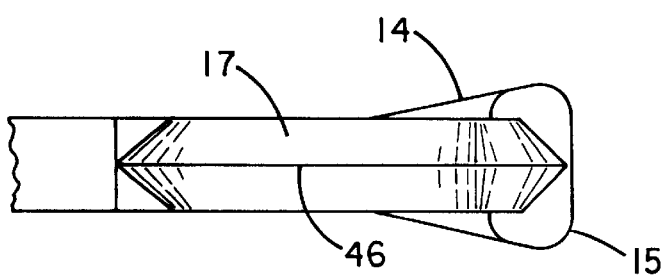
FIG. 2
FIG. 3
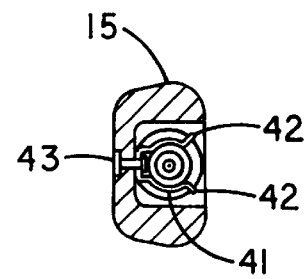
FIG. 4

EMERGENCY GLASS REMOVAL TOOL

BACKGROUND OF THE INVENTION

1. Field of the Invention

The present invention relates to emergency tools and more particularly pertains to a new emergency glass removal tool for breaking out a windshield and other windows of a vehicle for extricating a person from the vehicle.

2. Description of the Prior Art

The use of emergency tools is known in the prior art. More specifically, emergency tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,315,725; U.S. Pat. No. 4,268,926; U.S. Pat. No. 5,103,520; U.S. Pat. No. 5,026,173; U.S. Pat. No. 4,693,403; and U.S. Pat. No. Des 356,020.

While these devices fulfill their respective, particular objectives and requirements, the aforementioned patents do not disclose a new emergency glass removal tool. The inventive device includes an elongate frame member that has opposite first and second ends and a longitudinal axis extending between the ends. A handle portion is coupled to the second end of the frame member and has a grasping portion, a scraping portion extending between the grasping portion and the second end of the frame member, and a ax portion extending between the grasping portion and the second end of the frame member.

In these respects, the emergency glass removal tool according to the present invention substantially departs from the conventional concepts and designs of the prior art, and in so doing provides an apparatus primarily developed for the purpose of breaking out a windshield and other windows of a vehicle for extricating a person from the vehicle.

SUMMARY OF THE INVENTION

In view of the foregoing disadvantages inherent in the known types of emergency tools now present in the prior art, the present invention provides a new emergency glass removal tool construction wherein the same can be utilized for breaking out a windshield and other windows of a vehicle for extricating a person from the vehicle.

The general purpose of the present invention, which will be described subsequently in greater detail, is to provide a new emergency glass removal tool apparatus and method which has many of the advantages of the emergency tools mentioned heretofore and many novel features that result in a new emergency glass removal tool which is not anticipated, rendered obvious, suggested, or even implied by any of the prior art emergency tools, either alone or in any combination thereof.

To attain this, the present invention generally comprises an elongate frame member that has opposite first and second ends and a longitudinal axis extending between the ends. A handle portion is coupled to the second end of the frame member and has a grasping portion, a scraping portion extending between the grasping portion and the second end of the frame member, and a ax portion extending between the grasping portion and the second end of the frame member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the pre sent invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emergency glass removal tool apparatus and method which has many of the advantages of the emergency tools mentioned heretofore and many novel features that result in a new emergency glass removal tool which is not anticipated, rendered obvious, suggested, or even implied by any of the prior art emergency tools, either alone or in any combination thereof.

It is another object of the present invention to provide a new emergency glass removal tool which may be easily and efficiently manufactured and marketed.

It is a further object of the present invention to provide a new emergency glass removal tool which is of a durable and reliable construction.

An even further object of the present invention is to provide a new emergency glass removal tool which is susceptible of a low cost of manufacture with regard to both materials and labor, and which accordingly is then susceptible of low prices of sale to the consuming public, thereby making such emergency glass removal tool economically available to the buying public.

Still yet another object of the present invention is to provide a new emergency glass removal tool which provides in the apparatuses and methods of the prior art some of the advantages thereof, while simultaneously overcoming some of the disadvantages normally associated therewith.

Still another object of the present invention is to provide a new emergency glass removal tool for breaking out a windshield and other windows of a vehicle for extricating a person from the vehicle.

Yet another object of the present invention is to provide a new emergency glass removal tool which includes an elongate frame member that has opposite first and second ends and a longitudinal axis extending between the ends. A handle portion is coupled to the second end of the frame member and has a grasping portion, a scraping portion extending between the grasping portion and the second end of the frame member, and a ax portion extending between the grasping portion and the second end of the frame member.

Still yet another object of the present invention is to provide a new emergency glass removal tool that provides all tools necessary to remove a window of a vehicle, thereby reducing the risk of grabbing the wrong tool and then losing precious time searching for the proper tool.

Even still another object of the present invention is to provide a new emergency glass removal tool that reduces the number of people that are needed to extricate a person from a vehicle by providing all necessary tools in one tool. This prevents overcrowding at an accident site as well.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new emergency glass removal tool according to the present invention.

FIG. 2 is a schematic detailed view of the present invention taken from line 2—2 of FIG. 1.

FIG. 3 is a schematic detailed view of the present invention taken from line 3—3 of FIG. 1.

FIG. 4 is a schematic cross-sectional view of the present invention taken from line 4—4 of FIG. 1.

DESCRIPTION OF THE PREFERRED EMBODIMENT

Figure 5:
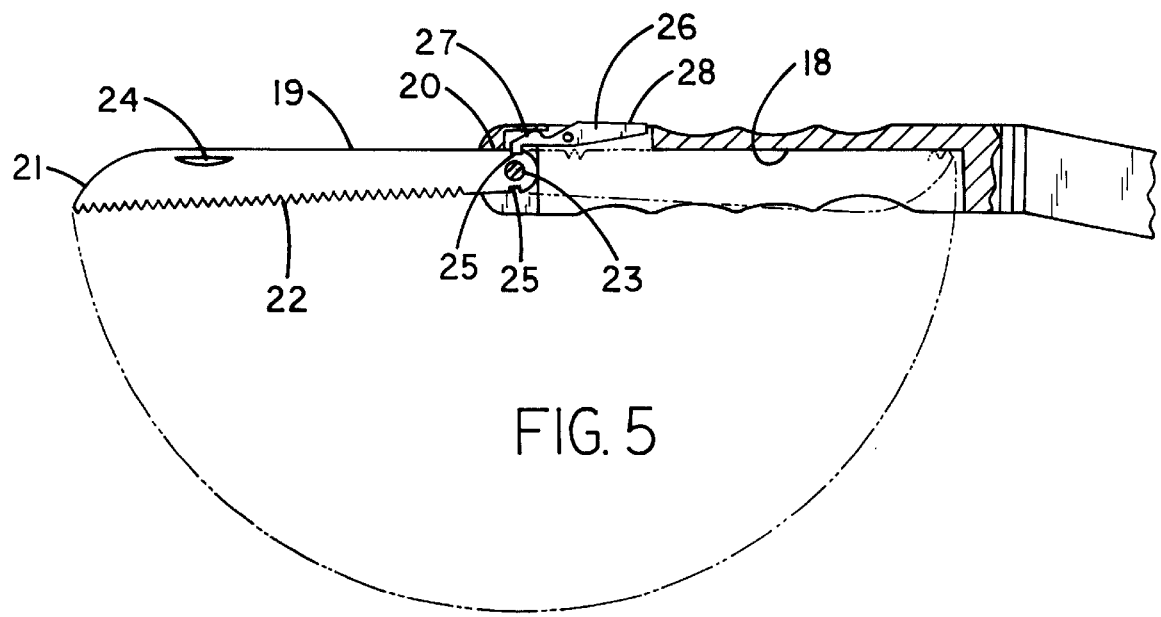
FIG. 5 is a schematic detailed view of the present invention illustrating the pivoting of the saw blade.
Figure 6:
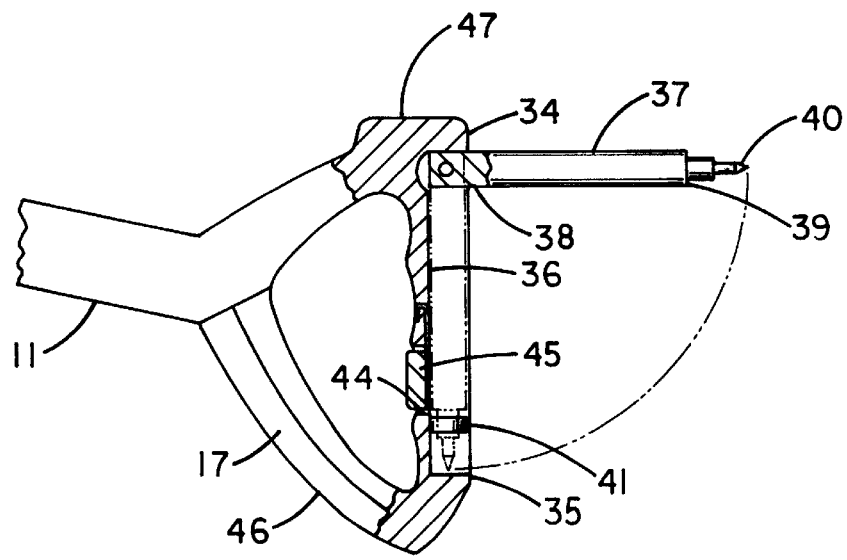
FIG. 6 is a schematic detailed view of the present invention illustrating the pivoting of the punch.

With reference now to the drawings, and in particular to FIGS. 1 through 6 thereof, a new emergency glass removal tool embodying the principles and concepts of the present invention and generally designated by the reference numeral 10 will be described.

As best illustrated in FIGS. 1 through 6, the emergency glass removal tool 10 generally comprises an elongate frame member 11 that has opposite first and second ends 12,13 and a longitudinal axis extending between the ends. A handle portion 14 is coupled to the second end of the frame member and has a grasping portion 15, a scraping portion 16 extending between the grasping portion and the second end of the frame member, and an ax portion 17 extending between the grasping portion and the second end of the frame member. Preferably, the frame member has a channel 18 that extends into a lower surface thereof from the first end towards the second end of the frame member. A saw blade 19 that is adapted for sawing through glass has proximal and distal ends 20,21 and a serrated edge 22 that extends between the proximal and distal ends. The proximal end of the saw blade is pivotally coupled to the first end of the frame member in the channel of the frame member by a pin 23.

The saw blade is positionable between a deployed position and a retracted position. Preferably, the saw blade is positioned at an angle of between about 150 and 210 degrees, ideally about 180 degrees, from the longitudinal axis of the frame member when in the deployed position and is disposed in the channel of the frame member when in the retracted position. Ideally, the saw blade has a catch channel 24 that is positioned towards its distal end for helping move the saw blade from a retracted position towards a deployed position when a fingernail is placed into the catch channel.

Preferably, the proximal end of the saw blade has opposed locking notches 25 extending therein. The first end of the frame member has a release lever 26 pivotally coupled to it for locking the saw blade in the deployed position and the retracted position. The release lever has a flanged end 27 that engages the proximal end of the saw blade. The flanged end is inserted in one of the locking notches when the saw blade is in the deployed position and is inserted in another of the locking notches when the saw blade is in the retracted position. Ideally, the flanged end of the release lever is biased towards the proximal end of the saw blade.

The release lever has a button end 28 that extends into an aperture in an upper surface of the frame member. Actuation of the button end of the release lever pivots the release lever such that the flanged end moves away from the saw blade thereby removing the flanged end from a locking notch and permitting the saw blade to pivot.

Preferably, the frame member has a bend 29 that defines a first portion 30 and a second portion 31. The first portion is positioned towards the first end of the frame member. Ideally, the first portion is oriented at an obtuse angle to the second portion of the frame member. Most ideally, the first portion is oriented at an angle of about 165 degrees to the second portion of the frame member. The bend is designed to reduce exertion of a user when using either the saw blade or the ax portion.

Preferably, the frame member has a series of shallow corrugations 32 extending therealong between the first end of the frame member and the bend of the frame member for preventing slipping of fingers of a hand therealong. The frame member may also have a corrugated outer surface 33 on which the corrugations of the corrugated outer surface of the first portion are less than about ¼ as wide as the shallow corrugations.

A handle portion is coupled to the second end of the frame member. Preferably, the handle portion has a generally D-shaped profile. The handle portion includes a grasping portion, a scraping portion that extends between the grasping portion and the second end of the frame member, and an ax portion extending between the grasping portion and the second end of the frame member.

The grasping portion serves as a handle when sawing with the saw blade and has upper and lower ends 34,35 and a longitudinal axis that extends between the upper and lower ends.

Preferably, the grasping portion has a channel 36 extending into its outer face. An elongate punch 37 with proximal and distal ends 38,39 is disposable in the channel of the grasping portion. The proximal end of the punch is pivotally coupled to the upper end of the grasping portion in the channel of the grasping portion. Ideally, the distal end of the punch has a pointed tip 40 adapted for piercing glass.

The punch is positionable between a deployed position and a retracted position. Preferably, the punch is positioned substantially perpendicular to the longitudinal axis of the grasping portion when in the deployed position and is disposed in the channel of the grasping portion when in the retracted position.

Preferably, the grasping portion has a clip 41 disposed in the channel thereof. The clip is generally U-shaped and has a pair of opposed curved wings 42 that are adapted for frictionally holding the punch between them. The clip may be coupled to the channel of the grasping portion by a rivet 43.

Also preferably, the grasping portion has an aperture 44 that extends through an inner face thereof into the channel of the grasping portion. A release button 45 is slidably disposed in the aperture of the grasping portion for pushing the punch out of the clip towards a deployed position.

The inner face of the grasping portion may have a series of shallow corrugations extending along it between the scraping portion and the ax portion for preventing slipping of fingers of a hand therealong.

Preferably, the ax portion of the handle portion is generally J-shaped and has an outer tapered edge 46 extending along it between the grasping portion and the second end of the frame member. The tapered edge is adapted for striking glass for opening a hole through which to insert the saw blade or to break away glass near a dashboard where using the saw blade would be difficult.

Also preferably, the handle portion has a hammer head 47 that is positioned at an intersection of the grasping portion and the scraping portion of the handle portion with a face 48 that is generally perpendicular to the longitudinal axis of the grasping portion. The hammer head is adapted for striking glass, especially where a person may be near the glass, thus making it dangerous to use the punch, saw blade, or ax portion to break the glass.

The preferred dimensions for the emergency glass removal tool 10 are about 15 inches between the first end of the frame member and the outer face of the grasping portion and about 6¾ inches between the top of the hammer head and the tip of the ax portion. The preferred width of the frame member between its upper and lower surfaces is about ¼ inches. The preferred length of the saw blade is about 6 inches. The preferred width of the saw blade is about 1 inch.

In use during an extrication of a person from a vehicle, a hole through a pane of glass such as a windshield is created with the ax portion or the punch. The saw blade is inserted into the hole and the grasping portion is grasped and pushed forward and backward to saw a sufficient portion of glass away to permit access of emergency personnel into the vehicle, or to get a victim out. In areas where the saw blade would be difficult to use, such as near the dashboard, the ax portion is used to chop away the glass. Also, if the saw blade is broken during the procedure, the ax may still be used as the primary tool. The punch is used to punch through the glass without excessive shattering, which is more likely to result when puncturing the glass with the ax portion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tool for breaking glass, comprising:
   an elongate frame member having opposite first and second ends and a longitudinal axis extending between said ends;
   a handle portion being coupled to said second end of said frame member; and
   said handle portion having a grasping portion, a scraping portion extending between said grasping portion and said second end of said frame member, and an ax portion extending between said grasping portion and said second end of said frame member.

2. The tool of claim 1, wherein said frame member has a channel extending into a lower surface thereof, a saw blade being pivotally coupled to said first end of said frame member and being disposable in said channel of said frame member.

3. The tool of claim 2, wherein said saw blade is positionable between a deployed position and a retracted position, said saw blade being positioned at an angle of between about 150 and 210 degrees from said longitudinal axis of said frame member when in said deployed position, said saw blade being disposed in said channel of said frame member when in said retracted position.

4. The tool of claim 3, wherein said saw blade has opposed locking notches extending therein, said first end of said frame member having a release lever pivotally coupled thereto, said release lever having a flanged end for engaging said locking notches of said saw blade for locking said saw blade in said deployed position and said retracted position.

5. The tool of claim 1, wherein said frame member has a bend defining a first portion and a second portion, said first portion being positioned towards said first end of said frame member, wherein said first portion is oriented at an obtuse angle to said second portion of said frame member.

6. The tool of claim 5, wherein said first portion is oriented at an angle of about 165 degrees to said second portion of said frame member.

7. The tool of claim 1, wherein said handle portion has a generally D-shaped profile.

8. The tool of claim 1, wherein said grasping portion has upper and lower ends and a longitudinal axis extending between said upper and lower ends, said grasping portion having a channel extending into an outer face thereof, an elongate punch having proximal and distal ends being pivotally coupled to said upper end of said grasping portion and being disposable in said channel of said grasping portion.

9. The tool of claim 8, wherein said punch is positionable between a deployed position and a retracted position, said punch being positioned generally perpendicular to said longitudinal axis of said grasping portion when in said deployed position, said punch being disposed in said channel of said grasping portion when in said retracted position.

10. The tool of claim 9, wherein said grasping portion has a clip disposed in said channel thereof, said clip being generally U-shaped and having a pair of opposed curved wings adapted for frictionally holding said punch therebetween.

11. The tool of claim 9, wherein said grasping portion has an aperture extending through an inner face thereof into said channel of said grasping portion, a release button being slidably disposed in said aperture of said grasping portion, said release button being for pushing said punch towards a deployed position.

12. The tool of claim 1, wherein said ax portion of said handle portion has an outer tapered edge extending therealong between said grasping portion and said second end of said frame member.

13. The tool of claim 12, wherein said ax portion of said handle portion is generally J-shaped.

14. The tool of claim 1, wherein said handle portion has a hammer head being positioned at an intersection of said grasping portion and said scraping portion of said handle portion.

15. A tool for breaking glass, comprising:
an elongate frame member having opposite first and second ends and a longitudinal axis extending between said ends;
said frame member having a channel extending into a lower surface thereof from said first end towards said second end of said frame member;
a saw blade being adapted for sawing through glass, said saw blade having proximal and distal ends and a serrated edge extending between said proximal and distal ends, said proximal end of said saw blade being pivotally coupled to said first end of said frame member in said channel of said frame member;
said saw blade being positionable between a deployed position and a retracted position, said saw blade being positioned at an angle of about 180 degrees from said longitudinal axis of said frame member when in said deployed position, said saw blade being disposed in said channel of said frame member when in said retracted position;
said saw blade having a catch channel being positioned towards said distal end thereof for helping move said saw blade from a retracted position towards a deployed position;
said proximal end of said saw blade having opposed locking notches extending therein;
said first end of said frame member having a release lever pivotally coupled thereto for locking said saw blade in said deployed position and said retracted position, said release lever having a flanged end engaging said proximal end of said saw blade, said flanged end being inserted in one of said locking notches when said saw blade is in said deployed position, said flanged end being inserted in another of said locking notches when said saw blade is in said retracted position;
said flanged end of said release lever being biased towards said proximal end of said saw blade;
said release lever having a button end extending into an aperture in an upper surface of said frame member, wherein actuation of said button end of said release lever pivots said release lever such that said flanged end moves away from said saw blade;
said frame member having a bend defining a first portion and a second portion, said first portion being positioned towards said first end of said frame member;
wherein said first portion is oriented at an obtuse angle to said second portion of said frame member;
said frame member having a series of shallow corrugations extending therealong between said first end of said frame member and said bend of said frame member for preventing slipping of fingers of a hand therealong;
a handle portion being coupled to said second end of said frame member, said handle portion having a generally D-shaped profile;
said handle portion having a grasping portion, a scraping portion extending between said grasping portion and said second end of said frame member, and an ax portion extending between said grasping portion and said second end of said frame member;
said grasping portion having upper and lower ends and a longitudinal axis extending between said upper and lower ends;
said grasping portion having a channel extending into an outer face thereof;
an elongate punch having proximal and distal ends, said proximal end of said punch being pivotally coupled to said upper end of said grasping portion in said channel of said grasping portion;
said punch being positionable between a deployed position and a retracted position, said punch being positioned substantially perpendicular to said longitudinal axis of said grasping portion when in said deployed position, said punch being disposed in said channel of said grasping portion when in said retracted position;
said distal end of said punch having a pointed tip adapted for piercing glass;
said grasping portion having a clip disposed in said channel thereof, said clip being generally U-shaped and having a pair of opposed curved wings adapted for frictionally holding said punch therebetween;
said grasping portion having an aperture extending through an inner face thereof into said channel of said grasping portion;
a release button being slidably disposed in said aperture of said grasping portion, said release button being for pushing said punch out of said clip towards a deployed position;
said inner face of said grasping portion having a series of shallow corrugations extending therealong between said scraping portion and said ax portion for preventing slipping of fingers of a hand therealong;
said ax portion of said handle portion being generally J-shaped and having an outer tapered edge extending therealong between said grasping portion and said second end of said frame member, said tapered edge being adapted for striking glass; and
said handle portion having a hammer head being positioned at an intersection of said grasping portion and said scraping portion of said handle portion, a face of said hammer head being oriented generally perpendicular to the longitudinal axis of the grasping portion, said hammer head being adapted for striking glass.

* * * * *